Patented Mar. 28, 1950

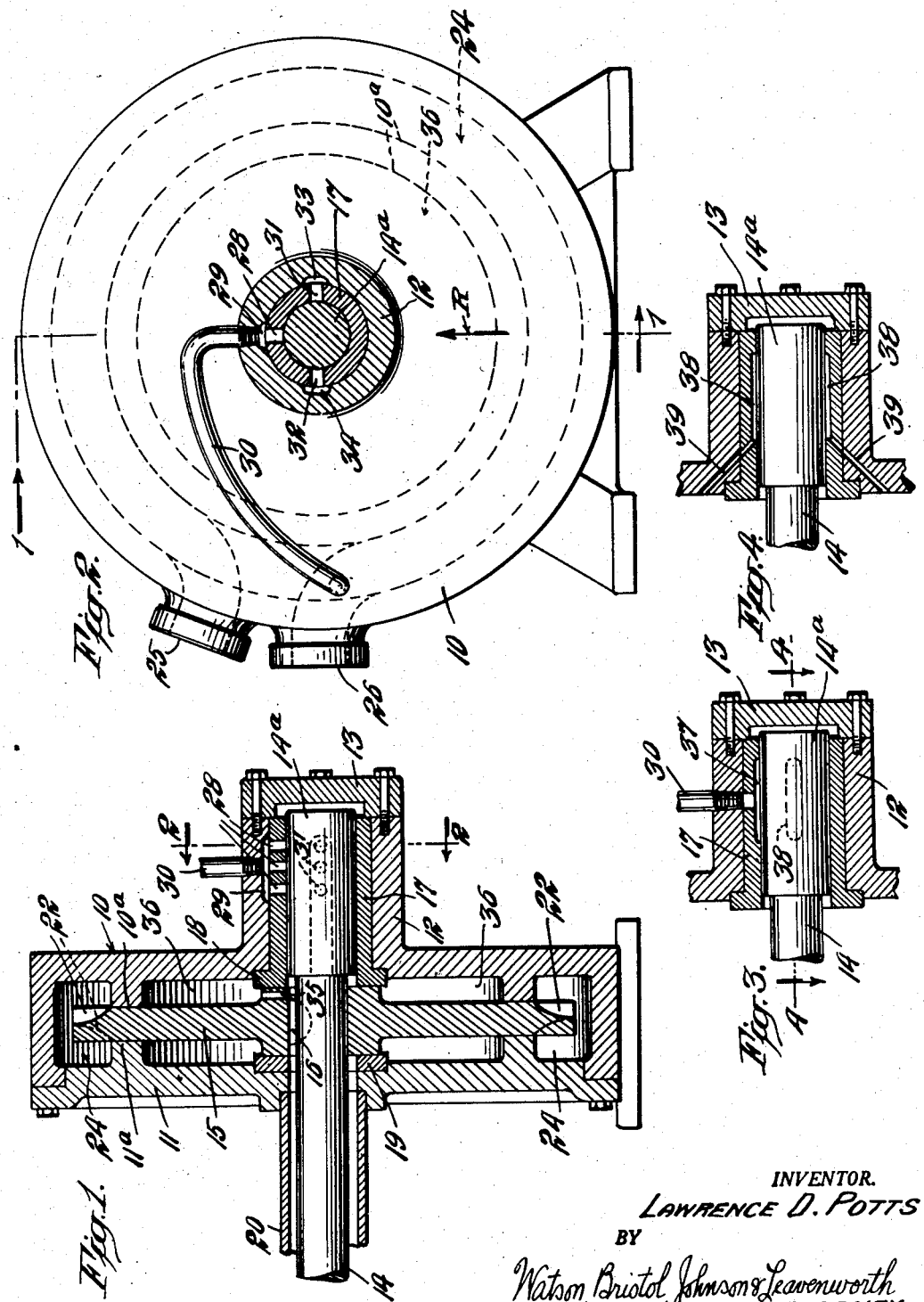

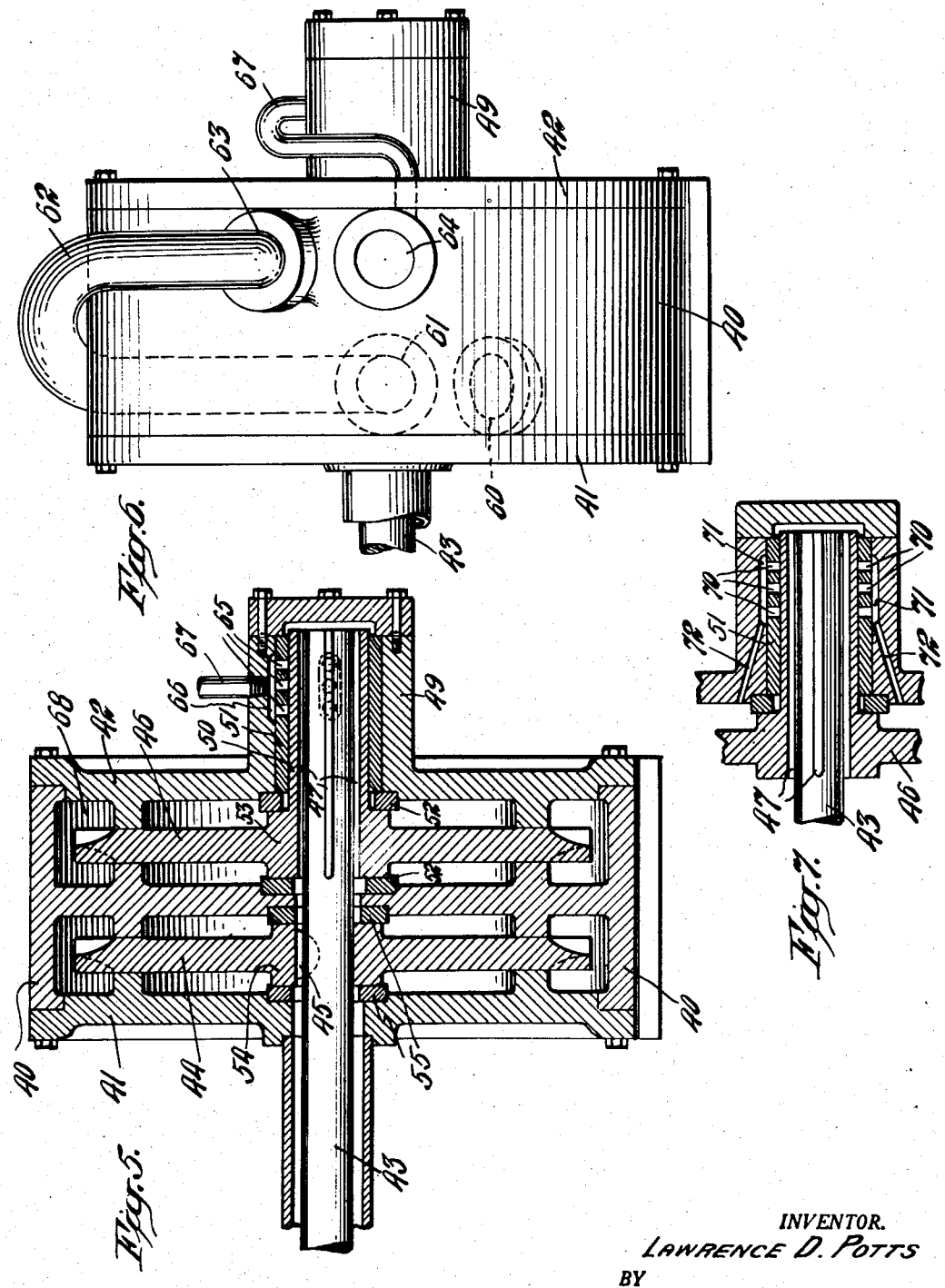

2,502,173

UNITED STATES PATENT OFFICE 2,502,173

FLUID BALANCING MEANS

Lawrence D. Potts, Kenmore, N. Y., assignor to The Linde Air Products Company, a corporation of Ohio Application April 9, 1946, Serial No. 660,663

2 Claims. (Cl. 103—112)

The invention is concerned with a pressure balancing means for rotary fluid power devices to relieve the bearings of excessive pressures, and correspondingly reduce friction and wear. It is particularly directed to the incorporation of such means in rotary fluid devices adapted to pump liquefied gases of a character having a low boiling point considerably below 273° K. at atmospheric pressure, such as liquid oxygen. The problem involved is similar to that described in the patent to Zenner and Yendall No. 2,340,787, the present invention comprising another solution having certain advantages peculiar to the principle and arrangement to be disclosed.

The highly volatile character of the materials pumped imposes a practical requirement of avoiding heat leakage into the material which produces volatilization and consequent interference with the operation through gas binding. A primary source of heat is through friction at the bearings, which is dependent upon the bearing pressures involved and the degree of lubrication which can be effected and maintained. The provision of adequate lubrication, however, is complicated by the desirability of avoiding contamination of the liquid material being handled, as, for example, in the case of liquid oxygen it is quite desirable to exclude therefrom the normal hydrocarbon lubricants which have a strong affinity for oxygen. To meet this condition, bearings have been employed in the case of liquid oxygen pumps which are composed of a solid self-lubricating material chemically inert to oxygen. It is of particular advantage to lighten the working pressure on bearings of such character and thereby lessen the wear as well as the generation of heat.

It is an inherent characteristic of devices of the type here concerned that the rotary working element is subjected to forces acting radially inward thereon which are non-uniform throughout the periphery, and there is produced a net resultant radial force of considerable amount which must be absorbed by the radial bearing means. Bearing wear and friction are, of course, proportional to the amount of this bearing pressure.

It is an object of this invention to achieve an effective and economical means capable of providing an off-setting or counteracting force to the inherent resultant force above described and to accomplish this without complicating or unduly enlarging the structure and at the same time without departure from the close running fit required of bearings in power devices of the character concerned, and without substantial sacrifice of bearing area. The principle and nature of the means are such as to render it easily adaptable to variable conditions of operation, including different fluid pressures and different specific constructions of power devices. It is a particular object to incorporate such a means in a rotary device adapted to pump liquid oxygen and provided with bearing means of the solid self-lubricating character noted above.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which:

Fig. 1 is a vertical view in cross-section taken on the line 1—1 of Fig. 2 showing a turbine type pump embodying the invention;

Fig. 2 is an end view of the pump of Fig. 1 taken on the line 2—2 thereof;

Fig. 3 is a fragmentary showing of a modified arrangement of fluid passages for effecting the balancing adapted to be employed in the pump of Figs. 1 and 2;

Fig. 4 is a cross-section taken on the line 4—4 of Fig. 3.

Fig. 5 is a vertical section of a two-stage turbine pump embodying the principles of the invention in somewhat modified structural form;

Fig. 6 is a vertical elevation of the pump of Fig. 5 showing particularly the fluid connections; and Fig. 7 is a fragmentary cross-section through the hub portion of Fig. 5 showing certain fluid passages.

An application of the invention is shown in simple form in Figs. 1 and 2, the particular device intended to be depicted being a single-stage rotary pump of the bladed turbine type. The structure includes a main housing 10 having an end cover plate 11. The housing 10 has a tubular extension 12 provided with a cap plate 13. Rotatably mounted in the housing is a drive shaft 14 on which is mounted the rotary working element comprising here a turbine type bladed pump impeller 15 having a driving connection to the shaft by way of the key 16. The inner end 14a of the shaft as shown is enlarged and is supported in a radial bearing bushing or sleeve 17.

Suitable thrust bearing means are provided. In the particular illustration this is effected at one side of the impeller by a collar 18 integral with the bushing 17; and at the opposite side by an annular thrust bearing ring 19.

The periphery of the impeller is bladed as shown at 22 in accordance with standard construction, there being similar blades on each side alternately arranged. Such blades may conveniently be formed by milling slots of the character indicated.

It is of advantage, particularly in the case of pumps intended to operate on liquid oxygen, to form the bearing sleeve 17 of a material which is self-lubricating, not requiring the addition of any lubrication from the outside such as the liquid hydrocarbons. A bearing sleeve composed of bonded graphite, preferably impregnated with a suitable material, is especially good for the purpose. In addition to being self-lubricating, the bearing means is inert to liquid oxygen. The thrust bearing means embodies preferably a bearing surface at each side of the impeller of like material which in the present construction is supplied by forming the collar 18 and the opposite ring 19 of such material. The construction enables the inner end of the drive shaft and the bearing means to be completely enclosed in the pump casing as shown, and the pump may be heat insulated to the extent desired. The outer drive end of shaft 14 is preferably supported in an outboard bearing remote from the pump housing. In this connection the housing is provided with a tubular shaft housing 20 at the outer end of which is located a seal. The details of such construction are omitted since they form no part of the present invention. In general, however, the arrangement may be similar to that shown in the patent to Hansen 2,296,640. The construction functions to exclude lubricating materials from the pump housing and reduce heat leakage into the pump.

The bladed portion of the pump impeller operates in a pumping channel 24, the intake for the channel being shown at 25 in Fig. 2 and the outlet at 26. The impeller rotates clockwise in Fig. 2. It will be understood that the drawings are merely illustrative and omit many details unnecessary to a clear disclosure of the principles of the invention.

It is a characteristic of devices of the type illustrated that the pump impeller is subjected to fluid pressure which acts radially inward and which increases progressively from the pump intake to a maximum at the pump discharge. The impeller, therefore, is subjected to unbalanced radial forces, the net resultant of which may be represented by a radial line passing through the axis of the impeller at a peripheral angle of about 90 degrees from the discharge outlet. In Fig. 2, for example, such resultant acts upwardly on a line indicated by the arrow R which coincides, approximately at least, with the vertical section line 1—1.

The arrangement in Figs. 1 and 2 constitutes a fluid pressure balancing means effective to counter-balance such resultant force. The balancing means embodies a fluid connection from a source of high pressure applied to the enlarged end 14a of the drive shaft at an area such as to act vertically downward in direct opposition to the net resultant of the working forces imposed on the impeller. As shown, the bushing 17 is provided with a plurality of radial apertures or chambers 28 communicating with a common groove or chamber 29 formed in the inner surface of the tubular housing extension 12. This chamber 29 is provided with a connection to a point of high pressure in the system by any suitable channel which may be formed in the casing, or, as shown in the drawings, by a small external tube 30 connected into the pump channel adjacent the outlet 26.

The number of openings 28 may be varied as to size and number to suit the conditions and to provide the proper amount of counterbalancing force needed. In general, however, the openings will be small in order not to sacrifice any substantial amount of bearing surface. For example, where the bushing 17 has an inner diameter of about 1½ inches, the openings 28 may be in the range of ¼ to ½ inch in diameter.

To restrict the area over which the pressure fluid applied through the openings 28 acts, and to insure in particular that it does not creep around the shaft far enough to reduce or nullify the counterbalancing force, suitably positioned release or bleed ports are provided at each side of the openings 28 in the peripheral direction. These release openings are shown at 31 and 32 in Fig. 2, the ports 31 being shown in dotted outline in Fig. 1. The openings 31 communicate with an axially extending groove 33, and the openings 32 with a similar groove 34. Suitable means are provided for relieving the pressure in the grooves and their respective openings by connecting the grooves to a point of low pressure relative to the pressure applied to the openings 28. In the present construction this may be easily accomplished by extending the grooves 33 and 34 to the left, as shown in Fig. 1, whereby they communicate with an annular space about the shaft which in turn communicates through the key way for key 16 and a hole 35 in the impeller with the space 36, of the pump housing. As in the case of the pressure applying openings 28, the release openings 31 and 32 may vary as to number, depending upon the circumstances, and, in addition, may vary as to particular location in respect to the peripheral spacing from the pressure applying openings 28, but should be small, similar to openings 28. As shown, they are located 90 degrees in each case from the openings 28.

It will be appreciated that with the location and total effective area of the pressure applying chamber or chambers established, the counterbalancing effect will vary in proportion to the amount of pressure developed at the discharge end of the pumping channel, which means that as the net resultant of the working forces varies the counterbalancing force will likewise vary automatically. The counterbalancing effect reduces wear on the bearing and reduces generation of heat by friction, a result particularly advantageous in pumping highly volatile liquids such as liquid oxygen. The balancing means lends additional practicability to the use of a radial bearing bushing of bonded graphite in lieu of the common metal bushings. The principle of the balancing means is such that it is not only adaptable to being embodied in the original construction of pumps but may also be applied easily to existing pumps. The arrangement has the distinct advantage that there is very little loss of bearing surface and the shaft end is supported in a close fitting bearing free of play or radial displacement. This latter is important in enabling the impeller to be provided with a close running fit in its channel particularly between the flange portions 10a and 11a of the casing which partition off the liquid pumping channel 24.

A modified arrangement of fluid passages and balancing means, which may be employed in connection with the pump of Figs. 1 and 2, is shown in Figs. 3 and 4. In this case the high pressure fluid in pipe 30 communicates through an opening in the bushing 17 with a chamber in the form of a groove 37 extending longitudinally of the inner surface of the bushing. Spaced 90° in the peripheral direction at each side of groove 37 is a groove 38 in the inner surface of bushing 17 each of which is connected to the interior of the pump housing adjacent the hub of the impeller by a hole 39 drilled in the pump housing and extending through the bushing 17. The groove 37 serves the same purpose as the openings 28 of Figs. 1 and 2, and the grooves 38 the same purpose as the openings 31 and 32. Each of the grooves, and particularly groove 37, may have an area chosen in accordance with the conditions of the particular case.

Another specific application of the principles of the invention is shown in Figs. 5 to 7. The structure there disclosed represents a rotary power device comprising a two-stage bladed turbine type pump, and consists of a main housing 40 having an end cover plate 41 at the left and an end cover plate 42 at the right enclosing the low pressure stage and higher pressure stage respectively. Mounted within the pump housing is a rotary drive shaft 43, the low pressure impeller 44 being driven by the shaft through a suitable drive connection such as the key means 45. The high pressure stage impeller 46 is adapted to be rotated through a spline connection 47 with the shaft 43, the impeller 46 being slidable thereon. The cover plate 42 has a tubular extension 49 adapted to house suitable radial bearing means for the high pressure stage impeller 46. In the present construction the impeller 46 is provided with a tubular hub portion 50 supported in a radial bearing sleeve or bushing 51 in the manner shown. The bearing sleeve is of a composition similar to that described in connection with the sleeve 17 of Figs. 1 and 2. The high pressure stage impeller 46 is also provided with suitable thrust bearing means comprising rings 52 located at either side of the hub portion 53. Similarly the hub portion 54 of the low pressure impeller 44 is provided with thrust bearings 55 at either side. The thrust bearing means for both impellers may be composed of a material similar to that of the radial bushing 51.

The fluid intakes and outlets for the two stages are shown in Fig. 6, comprising an inlet 60 for the low pressure stage and an outlet 61 therefor, the discharged liquid passing through the pipe 62 to the inlet 63 for the high pressure stage, which in turn has a final discharge outlet at 64. It will be observed that the two pressure stages are advantageously arranged 180 degrees apart so that the net resultant unbalanced force on one impeller is directly opposed to that of the other. It is characteristic, however, of such type devices that the pressure increase in the high pressure stage is considerably more than that in the low pressure stage, and correspondingly the net resultant unbalanced radial force on the high pressure stage impeller is greater than that on the low pressure stage impeller. To supply the difference, a fluid counterbalancing means is provided adjacent to or in conjunction with the second stage, similar in arrangement to that of Fig. 1, except in this case the counterbalancing force acts directly on the tubular hub portion 50 which is integral with the high pressure impeller 46. As shown in Fig. 5, the bushing member 51 has a plurality of radial openings 65 therein which communicate with a chamber 66 formed on the interior surface of the housing sleeve 49, the chamber 66 communicating through pipe 67 with the higher pressure end of the pumping channel 68 adjacent the outlet 64. Pressure release or bleed ports 70 (see Fig. 7) are located in the sleeve 51 at each side peripherally of the openings 65 in a manner similar to that shown in connection with Figs. 1 and 2. Ports 70 communicate in each case with a groove 71 on the interior surface of the housing hub extension 49, which in turn communicate through holes 72 with the interior of the pump housing. In general the functioning is similar to that described in connection with the application of the invention in the form of Figs. 1 and 2.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a rotary pump for pumping liquids having a boiling point at atmospheric pressure considerably below 273° K. said pump having a housing and a rotary impeller operative in a pumping channel therein and subjected in operation to non-uniform fluid pressures about its periphery producing a net resultant radial force acting in a certain direction, radial bearing means for said impeller embodying a stationary bushing mounted in said housing and a hub part rotative with said impeller supported in said bushing and having a snug rotary bearing fit therein, the bearing surface of said bushing having an opening therein but of limited area such as not to reduce substantially the supporting bearing surface, fluid conduit means connecting said opening with a point of liquid under pressure developed by said pump, the location and arrangement of said opening being such as to provide a radial force on said impeller counter to said net resultant radial force, and fluid pressure bleed openings in the wall of said bushing angularly spaced from said pressure applying opening at each side thereof and located respectively between said pressure applying opening and the opposite side of the bushing, said bleed openings having connections to a point in the pump of lower fluid pressure to prevent the fluid pressure applied at said first opening from extending around beyond said bleed openings to the opposite side, the peripheral extent of said pressure applying and bleed openings being relatively narrow and the axial extent thereof being selected to provide a total effective pressure area on said hub part correlated with the pressure difference provided by the connections to the points of higher and lower pressure whereby the resultant counterbalancing force is automatically varied according to the discharge pressure developed by the pump.

2. In combination a rotary fluid power element operative in a housing and having a hub portion and bearing means for said hub portion adapted to provide fluid pressure means for counterbalancing a resultant radial force on said hub portion in the operation of said element, comprising a bushing fitted in said housing and adapted to provide a snug rotary bearing support for said hub portion, the bearing surface of said bushing having a limited area cut out for the application of fluid pressure, fluid conduit means connecting said area with a point of fluid under pressure in said housing, the location and arrangement of said area being such as to provide a radial force on said hub portion counter to said net resultant force, and fluid pressure bleed means comprising an opening in the bearing surface of said bushing angularly spaced from said area at each side thereof and connected to a point in said housing of lower fluid pressure, said openings being located respectively between said area and the opposite side of the bushing to prevent the fluid pressure applied at said area from extending around to the opposite side of the bushing, said area being relatively narrow peripherally so as not to reduce substantially the bearing surface and having an axial extent selected to provide a total effective pressure area on said hub portion correlated with the pressure difference provided by the pressure connections to counterbalance said net resultant force automatically.

LAWRENCE D. POTTS.

REFERENCES CITED

The following references are of record in the file of this patent:

UNITED STATES PATENTS

| Number | Name | Date |
|---|---|---|
| 466,645 | Wood | Jan. 5, 1892 |
| 603,260 | Cook | May 3, 1898 |
| 2,225,761 | Asbridge | Dec. 24, 1940 |
| 2,340,787 | Zenner et al. | Feb. 1, 1944 |

FOREIGN PATENTS

| Number | Country | Date |
|---|---|---|
| 722,148 | France | Mar. 11, 1932 |